(12) United States Patent
Kobayashi

(10) Patent No.: US 6,440,024 B1
(45) Date of Patent: Aug. 27, 2002

(54) BELT-DRIVE CONTINUOUSLY VARIABLE TRANSMISSION

(75) Inventor: Daisuke Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 28 days.

(21) Appl. No.: 09/597,162

(22) Filed: Jun. 20, 2000

(30) Foreign Application Priority Data

Jun. 22, 1999 (JP) ............................................ 11-175232

(51) Int. Cl.$^7$ ................................ F16G 1/21; F16G 5/16
(52) U.S. Cl. ...................................... 474/242; 474/245
(58) Field of Search ................................ 474/201, 242, 474/244, 245, 202, 248

(56) References Cited

U.S. PATENT DOCUMENTS

| | | | | |
|---|---|---|---|---|
| 4,553,953 A | * | 11/1985 | Bock | 474/201 |
| 4,618,338 A | * | 10/1986 | Rattunde et al. | 474/242 X |
| 4,622,025 A | * | 11/1986 | Kern et al. | 474/242 X |
| 4,655,733 A | * | 4/1987 | Jonason | 474/242 |
| 4,698,050 A | * | 10/1987 | Hattori et al. | 474/242 |
| 5,123,880 A | * | 6/1992 | Sekine et al. | 474/244 |
| 5,439,422 A | | 8/1995 | Smeets et al. | 474/242 |

FOREIGN PATENT DOCUMENTS

| | | | |
|---|---|---|---|
| JP | 60-78134 | * | 5/1985 |
| JP | 7-12177 | | 1/1995 |

* cited by examiner

*Primary Examiner*—David A. Bucci
*Assistant Examiner*—Marcus Charles
(74) *Attorney, Agent, or Firm*—Foley & Lardner

(57) ABSTRACT

Provided is a belt-drive continuously variable transmission which comprises a pair of drive pulley and driven pulley, and a belt engaged with the pulleys. The belt includes an endless carrier and a plurality of transverse elements closely arranged on the carrier. Each transverse element has an edge and rotatable about the edge in the longitudinal direction of the belt and converging side faces for contact with contact surfaces of the pulleys. Each of the side faces is curved toward each of the contact surfaces in such a manner as to have, when each of the transverse elements is observed in a plan view, such a circular arc that is of a predetermined radius R and has a center located on a straight line perpendicular to each of the contact surfaces and extending through a point at which the edge and each of the contact surfaces meet.

20 Claims, 8 Drawing Sheets

$W_2 > W_1$

BELT-DRIVE CONTINUOUSLY VARIABLE TRANSMISSION

BACKGROUND OF THE INVENTION

The present invention relates in general to belt-drive continuously variable transmissions, and particularly to a belt-drive continuously variable transmission of the kind wherein a belt includes an endless carrier and a plurality of transverse elements positioned transversely on the endless carrier, the transverse elements being arranged in such a manner that adjacent two of the transverse elements are held in contact with each other, each transverse element having a rocking edge and rotatable about the rocking edge in the longitudinal direction of the belt for thereby enabling the belt to be wound around a drive pulley and a driven pulley.

A belt-drive continuously variable transmission is known from U.S. Pat. No. 5,439,422.

SUMMARY OF THE INVENTION

A problem of a prior art belt-drive continuously variable transmission is that each transverse element of a drive belt cannot be brought into contact at the entire side face thereof with the contact surface of a pulley but only partially, thus causing partial and excessive wear of the transverse elements and lowering of the coefficient of friction between the transverse element and the pulley. Thus, it is considered that the prior art belt-drive continuously variable transmission admits of improvement in the torque transmission capacity of the drive belt.

More specifically, in a continuously variable belt-drive transmission shown in FIGS. 9 to 12, each transverse element 2 of a drive belt 1 is tiltable or rotatable relative to adjacent element 2 about a rocking edge 6 for enabling the drive belt 1 to be wound around a drive pulley 4 and a driven pulley 5. Each transverse element 2 has a pair of converging side faces 2f for contact with the respective contact surfaces 4f(5f) of conical discs 4a(5a) and 4b(5b) of each pulley 4(5). The side faces 2f and 2f of each transverse element 2 are adapted to contact, at the entirety thereof, the respective contact surfaces 4f(5f) and 4f(5f) of the fixed conical disc 4a(5a) and the movable conical disc 4b(5b) substantially uniformly. Thus, a thrust N exerted by the pulley 4(5) against the transverse element 2 is distributed uniformly as shown in FIG. 11. Accordingly, the center C of action of the thrust N against the transverse element 2, when observed in FIG. 11, is positioned nearly at the center of the width of the side face 2f.

FIG. 12 shows a portion of a row of the transverse elements 2. Now, it is assumed such a condition wherein a torque of the pulley 4(5) is transmitted to the transverse element 2-1 to allow the transverse element 2-1 to be pressed against the adjacent transverse element 2—2. This condition can be substituted for such a condition wherein a driving force F directed along the contact surface 4f(5f) of the pulley 4(5) acts upon the center C of action of the thrust N against the transverse element 2. In this instance, since there is a distance ΔL between the center C of action of the thrust N and the rocking edge 6 when the transverse element 2 is observed in a side elevation shown in FIG. 12, a moment M (M=F×ΔL) acts upon the transverse element 2 in the direction indicated by the arrowhead.

Thus, the transverse elements 2, when operated to transmit a driving force F, are caused to tilt or rotate backward (i.e., in the direction opposite to the direction of advance of the drive belt 1) by the moment M while passing around the pulleys 4 and 5. Due to this, the side faces 2f and 2f of each transverse element 2 are not brought into contact at the entirety but only partially, i.e., only at the hatched area X of each side face 2f as shown in FIG. 12, thus causing the above described problem of partial and excessive wear of the transverse elements and lowering of the coefficient of friction between the transverse element and the pulley.

It is accordingly an object of the present invention to provide a novel and improved belt-drive continuously variable transmission which can attain an improved torque transmission capacity by preventing backward tilting or rotation of the transverse elements and thereby partial and excessive wear of the side faces of each transverse element, being causative of lowering of the coefficient of friction between the drive belt and the pulley.

To accomplish the above object, there is provided according to the present invention a novel and improved belt-drive continuously variable transmission which comprises a drive pulley and a driven pulley, and a belt engaged with the drive pulley and the driven pulley and including an endless carrier and a plurality of transverse elements closely arranged on the carrier. Each of the transverse element has an edge and rotatable about the edge in the longitudinal direction of the belt for enabling the belt to be wound around the drive pulley and the driven pulley. Each of the transverse elements has converging side faces for contact with contact surfaces of the drive pulley and the driven pulley. Each of the side faces, when observed in a plan view of each of the transverse elements, is protruded and curved toward each of the contact surfaces, only at a portion adjacent the edge.

DESCRIPTION OF THE PREFERRED EMBODIMENTS

Figure 1:
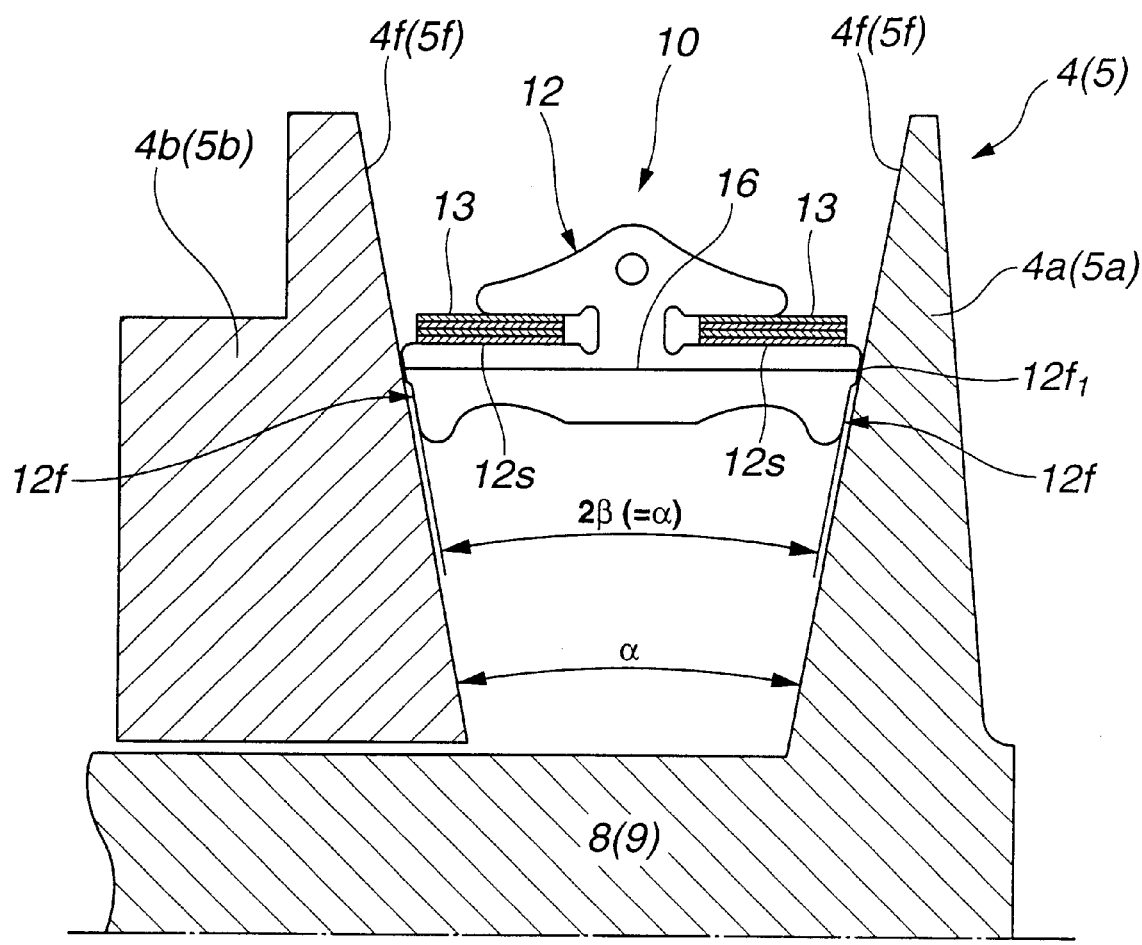
FIG. 1 is a fragmentary, sectional view of a belt-drive continuously variable transmission according to a first embodiment of the present invention.
Figure 2:
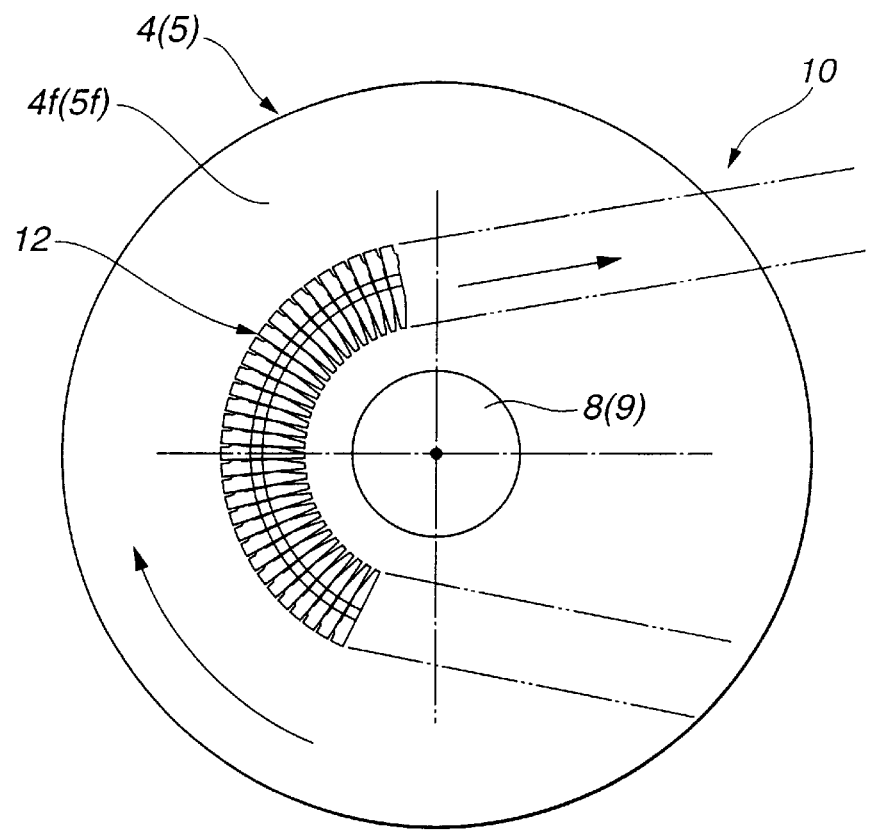
FIG. 2 is a reduced, fragmentary side elevation of the continuously variable transmission of FIG. 1, with an endless carrier being omitted.
Figure 3:
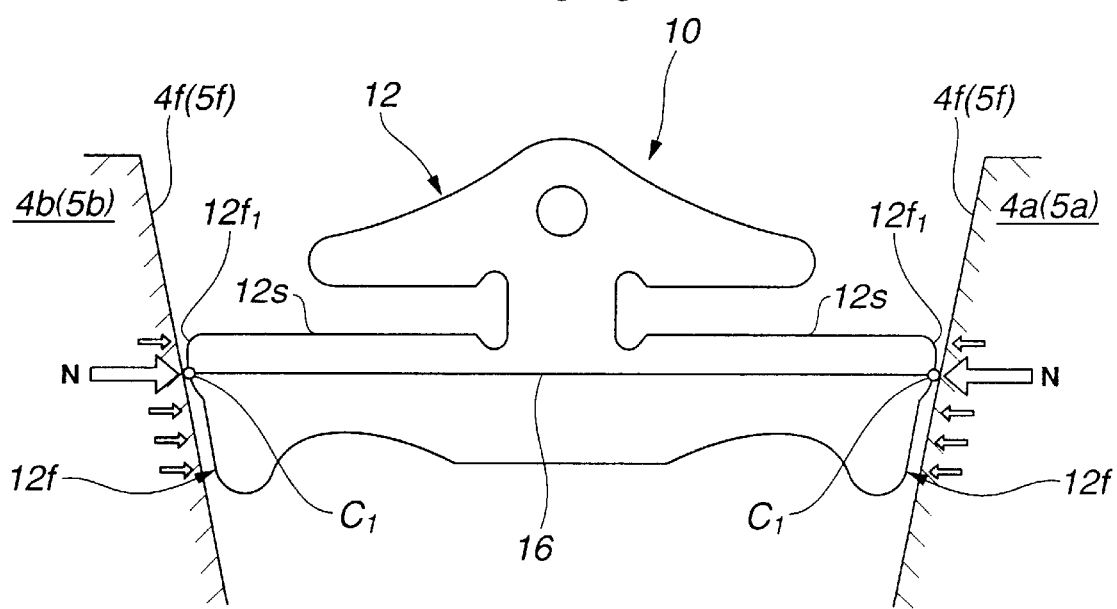
FIG. 3 is an enlarged, fragmentary sectional view of the continuously variable transmission of FIG. 1, with an endless carrier being omitted.
Figure 9:
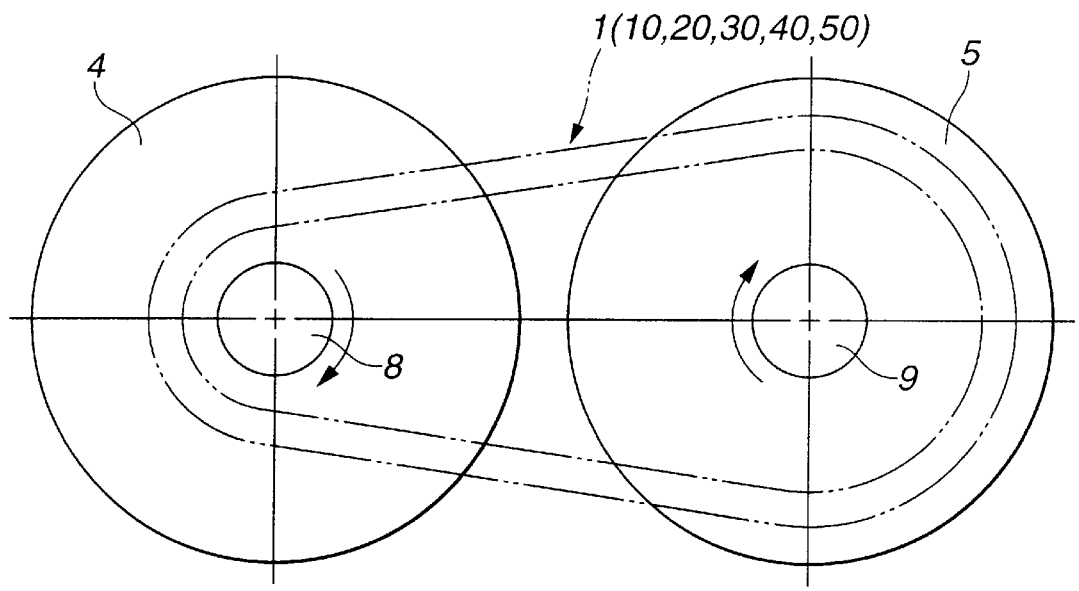
FIG. 9 is a diagrammatic view of a belt-drive continuously variable transmission in which the present invention is embodied.
Figure 10:
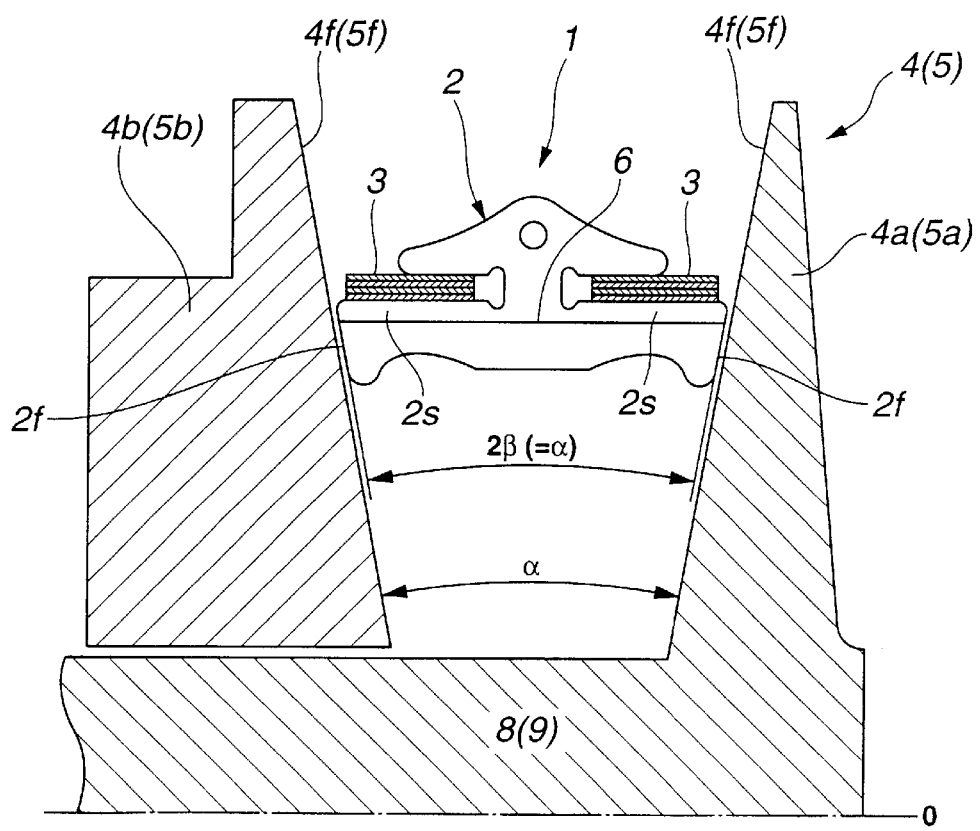
FIG. 10 is a view similar to FIG. 1 but shows a belt-drive continuously variable transmission having a problem to be solved by the present invention.
Figure 11:
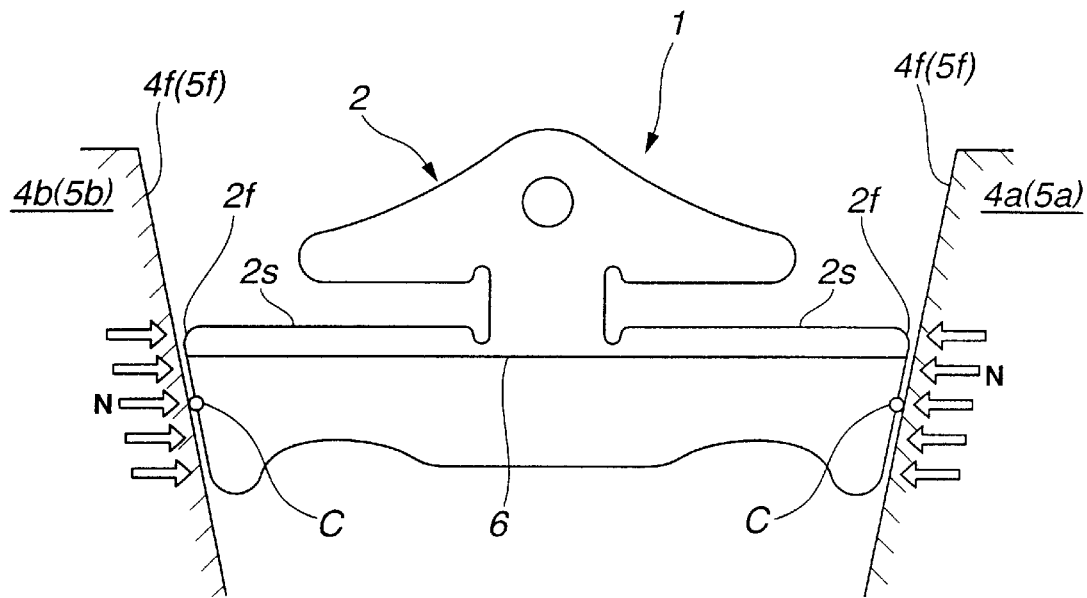
FIG. 11 is an enlarged, partly-sectional, fragmentary side elevation of the continuously variable transmission of FIG. 10.

Referring first to FIGS. 1 to 3, a belt-drive continuously variable transmission according to a first embodiment of the present invention includes a drive belt 10 wound around a primary pulley 4 and a secondary pulley 5 (refer to FIG. 9). Each pulley 4(5) includes a conical disc 4a(5a) fixed to a rotatable shaft 8(9) and a conical disc 4b(5b) movable axially on the rotatable shaft 8(9). The primary pulley 4 may be connected to an engine (not shown) so as to serve as an input pulley or drive pulley and drive the secondary pulley 5 by way of the drive belt 10 so that the secondary pulley 5 serves as an output pulley or driven pulley.

In FIG. 2, the drive belt 10 is shown with an endless flexible band or carrier being omitted. As shown in FIGS. 1 and 2, the drive belt 10 includes a plurality of transverse elements 12 arranged closely (i.e., in such a manner as to be brought into contact with adjacent transverse elements 12) in the longitudinal direction thereof, and a pair of endless bands or carriers 13 and 13 passing through and carrying thereon the transverse elements 12. Each transverse element 12 is tiltable or pivotable about a rocking edge 16 so as to enable the drive belt 10 to be wound around the primary pulley 4 and the secondary pulley 5.

Each transverse element 12 has a pair of shoulders 12S and 12S in engagement with the endless carriers 13 and 13, a pair of converging side faces 12f and 12f for contact with the contact surfaces 4f(5f) and 4f(5f) of the conical discs 4a(5a) and 4b(5b), and the rocking edge 16. The rocking edge 16, when observed in FIGS. 1 and 3, i.e., in a plan view of each transverse element 12, is positioned lower than the upper edge of the shoulder 12s, i.e., located between the upper edge of the shoulder 12s and the lower end of the transverse element 12, specifically away from the upper edge of the shoulder 12s by ⅕ of the distance between the upper edge of the shoulder 12s and the lower end of the transverse element 12.

In this embodiment, the side face 12f of each transverse element 12, when observed in FIGS. 1 and 3, i.e., in a plan view of the transverse element 12, is so shaped as to be convex or curved toward the contact surface 4f(5f) of each pulley 4(5) only at a portion adjacent the rocking edge 16 as indicated by $12f_1$ though the convex or curved side face portion $12f_1$ is shown exaggeratedly. Namely, the side face 12f has a protuberance $12f_1$ at a portion adjacent the rocking edge 16.

In the belt-drive continuously variable transmission of this embodiment, by so forming the side face 12f of the transverse element 12, the center $C_1$ of action of the thrust N against the transverse element 12, when observed in FIGS. 1 and 3, i.e., in a plan view of the transverse element 12, is positioned so as to coincide with the rocking edge 16 at all times. In other words, the side face 12f of each transverse element 12 has at a portion adjacent the rocking edge 16 such a protuberance $12f_1$ that causes the center $C_1$ of action of the thrust N against the transverse element 12 to coincide with the rocking edge 16.

Figure 12:
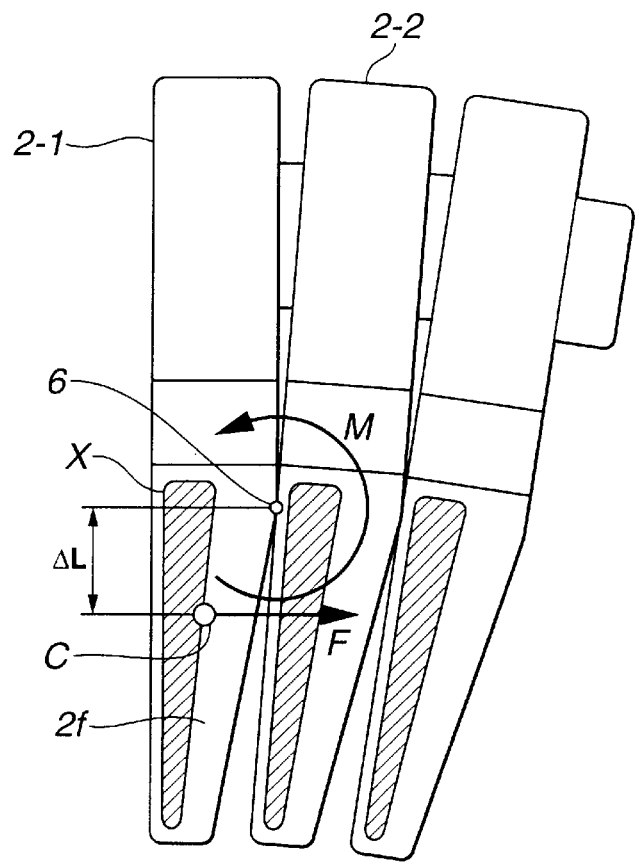
FIG. 12 is an enlarged side elevation of transverse elements of a drive belt employed in the continuously variable transmission of FIG. 10.

By the structure described above, there is not caused any moment as M (refer to FIG. 12) about the rocking edge 16, which causes the transverse element 12 to tilt or rotate backward, i.e., in the direction opposite to the direction of advance of the drive belt 10. Thus, the side face 12f of the transverse element 12 is brought into contact with the contact surface 4f(5f) of the pulley 4(5) not partially but at the entirety thereof, thus making it possible to prevent partial and excessive wear of the side faces 12f and 12f of each transverse element 12 and excessive lowering of the coefficient of friction between the drive belt 10 and the pulley 4(5). In this connection, it is to be noted that while the side face 12f of each transverse element 12 is partially convex or curved, it is actually brought into contact at its entirety while preventing undesirable tilting or rotation of the transverse element 12, due to its resilient deformation and the resilient deformation of the corresponding contact surface 4f(5f) resulting when it is brought into contact with the corresponding contact surface 4f(5f) of the pulley 4(5).

Further, the side face 12f of the transverse element 12 provided with such a protuberance $12f_1$ causes the center $C_1$ of action of the thrust N against the transverse element 12 never to deviate from the rocking edge 16 but to coincide with the rocking edge 16 assuredly as shown in FIG. 3 even if the angle a formed between the contact surfaces 4f(5f) varies a little.

Accordingly, the belt-drive continuously variable transmission of this embodiment can transmit the driving force F (refer to FIG. 12) acting on the side face 12f of each transverse element 12 assuredly and therefore can make higher the torque transmission capacity thereof.

Figure 4:
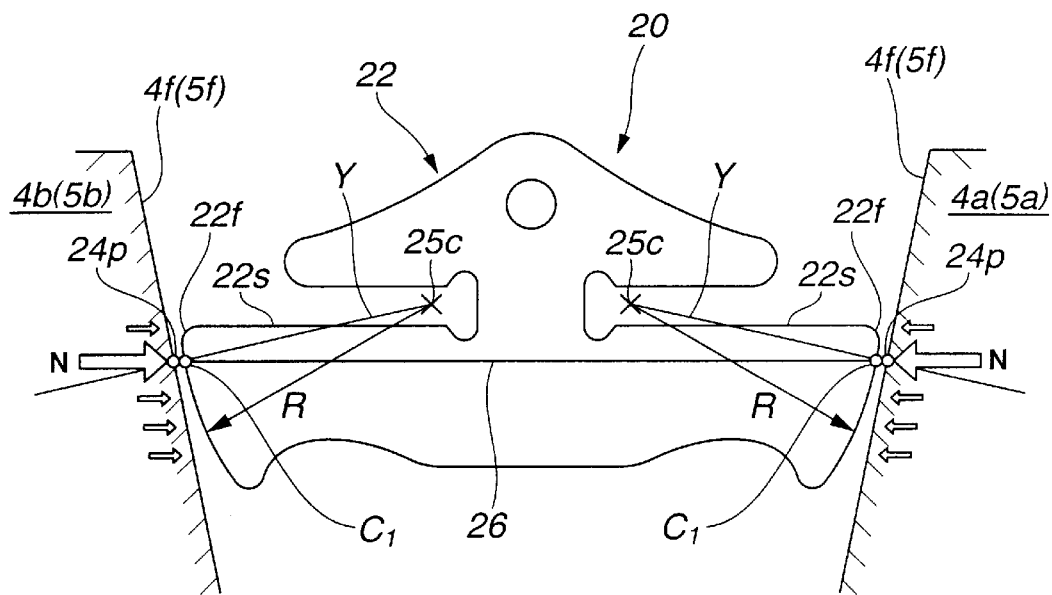
FIG. 4 is a view similar to FIG. 3 but shows a second embodiment.

FIG. 4 shows a belt-drive continuously variable. transmission according to a second embodiment of the present invention. In FIG. 4, like parts to those of the first embodiment described with respect to FIGS. 1 to 3 are designated like reference characters.

In this embodiment, the side face 22f of the transverse element 22 is convex or curved toward the contact surface 4f(5f) of the pulley 4(5) in a way as to be formed into, when observed in FIG. 4, i.e., in a plan view of the transverse element 22, such a circular arc that is of a radius R and has a center 25c located on a line Y perpendicular to the contact surface 4f(5f) and extending through a point 24p at which the rocking edge 26 and the contact surface 4f(5f) of the pulley 4(5) meet.

Except for the above, this embodiment is substantially similar to the first embodiment and can produce substantially the same effect.

The second embodiment of FIG. 4 will be described more in detail with reference to FIG. 5.

Now, assuming that the contact surface 4f(5f) of the pulley 4(5) is a planar surface made of steel and each side face 22f of the transverse element 22 is made up of a part of a cylinder of a radius R and made of steel, the half width b (mm) of the contact surface is calculated by the use of the formula of Hertz. That is, based on the maximum q (kgf/mm) of the thrust N supplied from the pulley 4(5) to the transverse element 22, per unit length, the inclination β of the contact surface 4f(5f) (i.e., so-called half sheave angle) and the Young's modulus E (kgf/mm²) of steel, the half width b (mm) of the contact surface area of the side face 22f can be obtained by the following expression.

$$b = (1.522) \times \sqrt{(q \times \cos\beta \times R \div E)} \geq dr$$

In this connection, assuming that dr is the distance between the contact surface of the transverse element 22 for contact with the endless carrier 13 (refer to FIG. 1), i.e., the surface of the shoulder 22s and the rocking edge 26, the center C, of action of the thrust N against the transverse element 22, when observed in FIG. 4, i.e., in a plan view of the transverse element 22, coincides with the rocking edge 26 at all times, provided that the half contact surface width b is smaller than the distance dr. Thus, the radius R is determined so as to satisfy the following equation.

$$(1.522) \times \sqrt{(q \times \cos \beta \times R \div E)} \geq dr$$

Then, substitution in the above equation of E=21000 (in case of steel) and solving the above equation for the radius R gives the following equation.

$$R \leq (dr)^2 \times 9065 \div (q \times \cos \beta)(mm) \qquad (1)$$

In this embodiment, the radius R can be set suitably and easily by using the above equation (1).

Accordingly, by determining the radius R in the above described manner, the second embodiment of FIG. 4 can be attained with efficiency.

In the meantime, regarding the equation (1), it is general that, for example, the distance dr is 1 (mm) and the inclination β is 11 (degree), and it is considered that the maximum value q of the thrust N against the pulley 4(5) ranges from 30 to 90 (kgf/mm)).

The reference numerical values for R based on the above numerical values are as follow.

In case q=30 (kgf/mm), R≦308 (mm)
In case q=50 (kgf/mm), R≦185 (mm)
In case q=90 (kgf/mm), R≦103 (mm)

Figure 5:
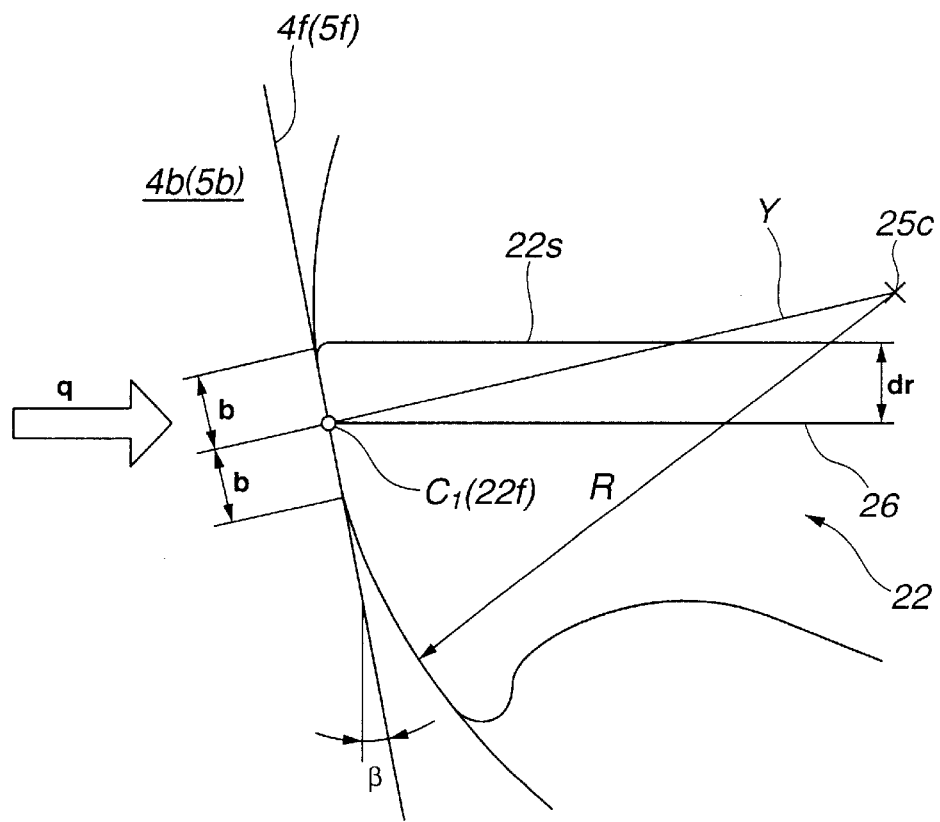
FIG. 5 is a diagrammatic view of an important portion of the second embodiment.

In the foregoing, it is to be noted that the side face $22f$ of each transverse element 22 is actually brought into contact at its entirety with the corresponding contact surface $4f(5f)$ of the pulley 4(5) due to the resilient deformation of the contact surface $4f(5f)$ in addition to its resilient deformation though transmission of a driving force or torque between each transverse element 22 and the pulley 4(5) is mainly carried out by way of the contact surface areas indicated by b in FIG. 5.

Figure 6:
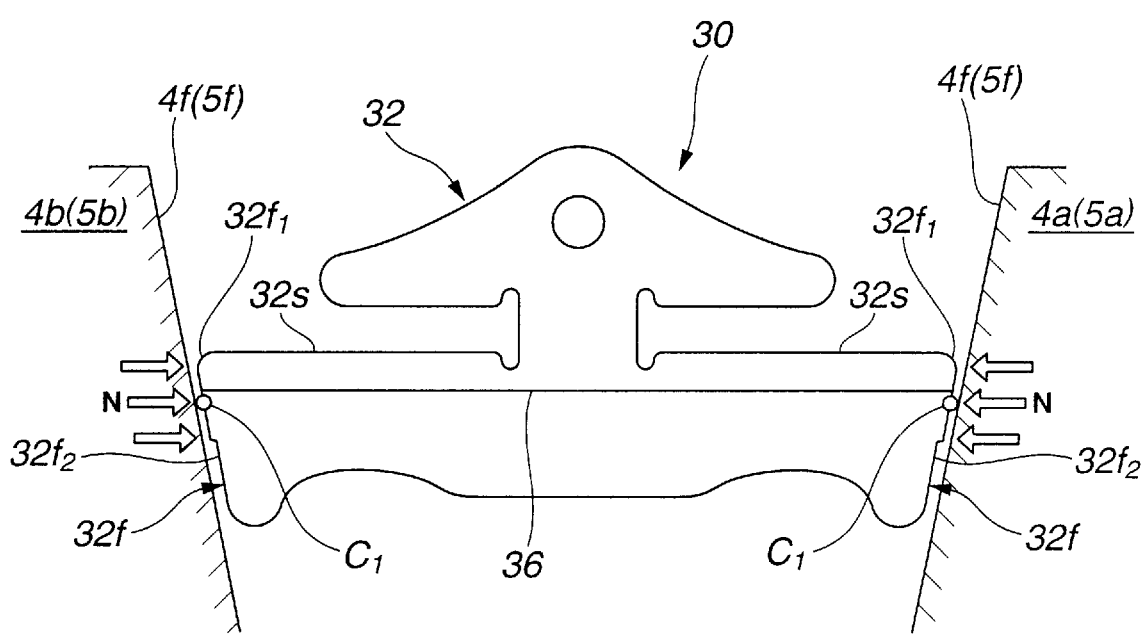
FIG. 6 is a view similar to FIG. 3 but shows a third embodiment.

FIG. 6 shows a belt-drive continuously variable transmission according to a third embodiment of the present invention.

This embodiment differs from the first embodiment in that the side face $32f$ of the transverse element 32 is shaped so as to allow only the contact surface area $32f_1$ including a portion joining the rocking edge 36 when observed in FIG. 6, i.e., in a plan view of the transverse element 32, to protrude toward the contact surface $4f(5f)$ of the pulley 4(5). Namely, the side face $32f$ is formed into a stepped shape. In this instance, it is desirable that the protruded contact surface area $32f_1$ is designed so as to be larger than the remaining area $32f_2$. Further, it is desirable that the edge of the transition between the contact surface area $32f_1$ and the remaining area $32f_2$ is chamfered.

Except for the above, this embodiment is substantially similar to the first embodiment described with reference to FIGS. 1 to 3 and can produce substantially the same effect.

Figure 7A:
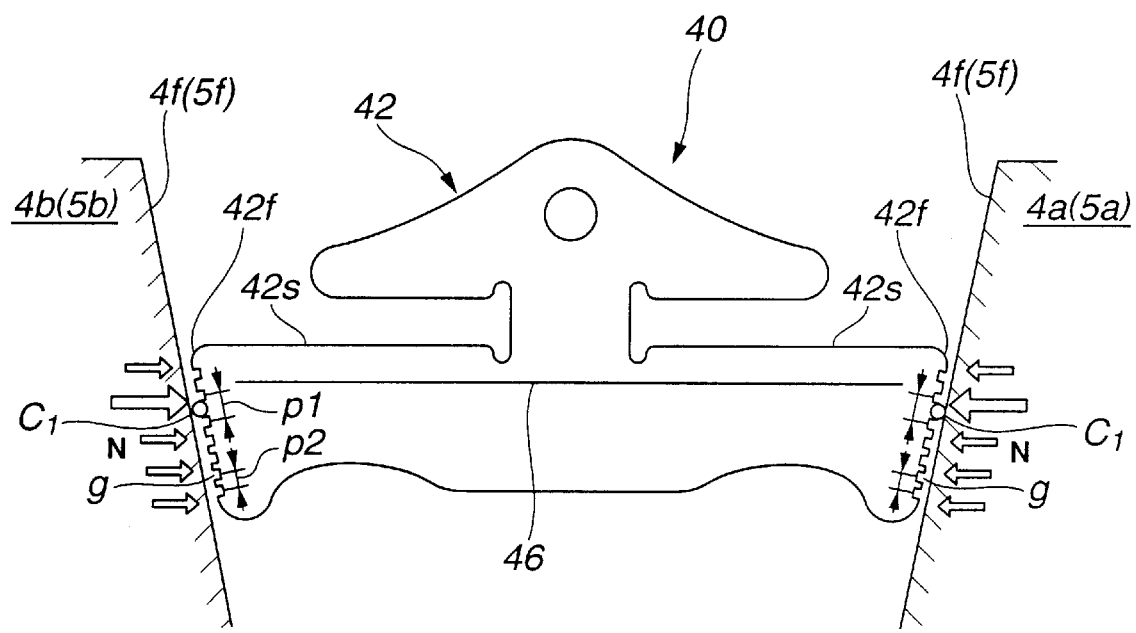
FIG. 7A is a view similar to FIG. 3 but shows a fourth embodiment.
Figure 7B:
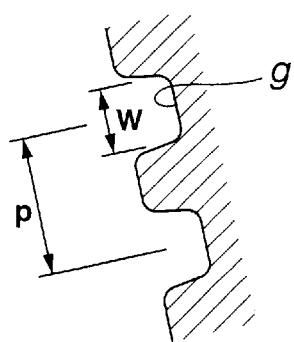
FIG. 7B is an enlarged, sectional view of a side face of a transverse element of a drive belt utilized in the continuously variable transmission of FIG. 7A.

FIGS. 7A and 7B show a fourth embodiment of the present invention. In FIGS. 7A and 7B, like parts and portions to those of FIGS. 1 to 3 are designated by like reference characters.

In this embodiment, the transverse element 42 of the drive belt 40 has a pair of side faces $42f$ and $42f$, each formed with a plurality of transverse grooves g in such a manner that the distance or pitch p between adjacent two grooves g becomes larger at a side face portion adjacent the rocking edge 46 and smaller at the remaining side face portion, when observed in FIG. 7A, i.e., in a plan view of the transverse element 42, so that the contact surface area of the side face $42f$ for contact with the contact surface $4f(5f)$ of the pulley 4(5) becomes larger at the side face portion adjacent the rocking edge 46 than at the remaining side face portion.

Specifically, as shown in FIG. 7A, the transverse grooves g have the same or uniform width W and the pitch p1 of the grooves g formed in the side face portion adjacent rocking edge 46 is larger than the pitch p2 of the grooves g formed in the remaining side face portion (i.e., p1>p2). In the meantime, since the grooves g have the uniform width W, they can be formed with ease.

Except for the above, this embodiment is substantially similar to the first embodiment of FIGS. 1 to 3 and can produce substantially the same effect.

Figure 8A:
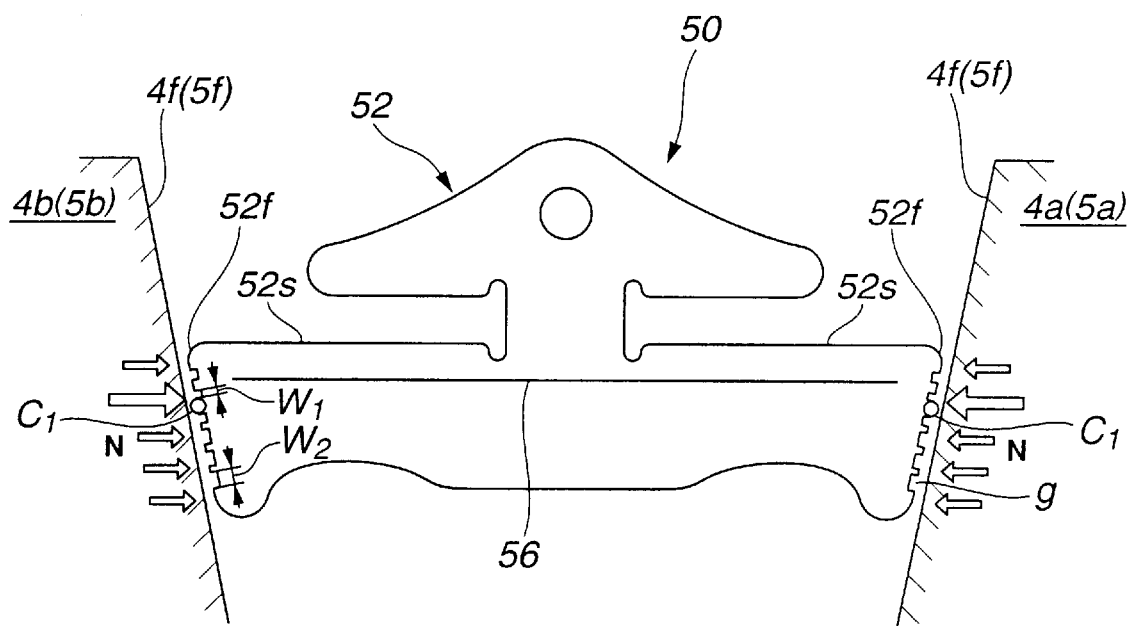
FIGS. 8A and 8B are views similar to FIGS. 7A and 7B but show a variation of the fourth embodiment.
Figure 8B:
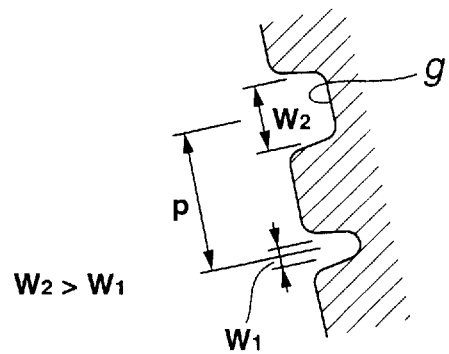

FIGS. 8A and 8B show a variant of the fourth embodiment of FIGS. 7A and 7B. In FIGS. 8A and 8B, like parts and portions to those of the embodiment of FIGS. 7A and 7B are designated by like reference characters.

In this variant, the width of the groove g becomes smaller at the side face portion adjacent the rocking edge 56 than at the remaining side face portion, i.e., at the side face portion remoter from the rocking edge 56, when observed in FIG. 8A, i.e., in a plan view of the transverse element 52, so that the contact surface of the side face $52f$ becomes larger at the side face portion adjacent the rocking edge 56 than at the remaining side face portion.

More specifically, as shown in FIG. 8B, the transverse grooves g are formed at a constant interval or pitch p, and the grooves g formed in the side face portion adjacent the rocking edge 56 have the width $W_1$ which is smaller than the width $W_2$ of the grooves g formed in the side face portion other than the side face portion adjacent the rocking edge 56.

Accordingly, since the grooves g located adjacent the rocking edge 56 are adapted to have a smaller width, a larger contact surface can be obtained adjacent the rocking edge 56.

Except for the above, this variant is substantially similar to the embodiment of FIGS. 7a and 7B and can produce substantially the same effect.

The entire contents of Japanese Patent Application P11-175232 (filed Jun. 22, 1999) is incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, while the endless band or carrier 13 consists of a plurality of endless flexible strips or layers which are laminated one upon another, it can be made up of a single endless flexible strip. The scope of the invention is defined with reference to the following claims.

What is claimed is:

1. A belt-drive continuously variable transmission comprising:

a drive pulley and a driven pulley; and a belt engaged with said drive pulley and said driven pulley, and including an endless carrier and a plurality of transverse elements closely arranged on said carrier;

each of said transverse elements having an edge in contact with an adjacent one of said transverse elements and pivotable about said edge relative to said adjacent one of said transverse elements in the longitudinal direction of said belt for enabling said belt to be wound around said drive pulley and said driven pulley;

each of said transverse elements having converging side faces for contact with contact surfaces of said drive pulley and said driven pulley, each of said side faces, when observed in a plan view of each of said transverse elements, being protruded and curved toward each of said contact surfaces, only at a portion adjacent said edge.

2. A belt-drive continuously variable transmission comprising:

a drive pulley and a driven pulley; and a belt engaged with said drive pulley and said driven pulley, and including an endless carrier and a plurality of transverse elements closely arranged on said carrier;

each of said transverse elements having an edge in contact with an adjacent one of said transverse elements and pivotable about said edge relative to said adjacent one of said transverse elements in a plane parallel to the longitudinal direction of said belt;

each of said transverse elements having converging side faces for contact with contact surfaces of said drive pulley and said driven pulley, each of said side faces being curved toward each of said contact surfaces in a way as to be formed into, when each of said transverse elements is observed in a plan view, such a circular arc that is of a predetermined radius R and has a center located on a straight line perpendicular to each of said contact surfaces and extending through a point at which said edge and each of said contact surfaces meet.

3. The belt-drive continuously variable transmission according to claim 2, wherein said radius R is determined so as to satisfy the equation of:

$$R \leq (dr)^2 \times 9065 \div (q \times \cos \beta)$$

where dr is a distance between said edge and a contact surface of a shoulder of each of said transverse elements, for contact with said carrier, q is a maximum value of a thrust applied from each of said contact surfaces of said drive pulley and said driven pulley to each of said transverse element, and $\beta$ is an angle of a slope of each of said contact surfaces of said drive pulley and said driven pulley.

4. In a belt-drive continuously variable transmission including a pair of pulleys, and a belt engaged with the pair of pulleys, and including an endless carrier and a plurality of transverse elements closely arranged on the carrier, each of the transverse elements having an edge in contact with an adjacent one of said transverse elements and pivotable about the edge relative to said adjacent one of said transverse elements in a plane parallel to the longitudinal direction of the belt for enabling the belt to be wound around the pair of pulleys, each of the transverse elements having converging side faces for contact with contact surfaces of the pulleys, the improvement wherein each of said side faces comprises means for allowing the center of action of a force transmitted between each of said transverse elements and each of said pulleys, when each of said transverse elements is observed in a plan view, to coincide with a point at which said edge and each of said contact surfaces meet.

5. The improvement according to claim 4, wherein said means comprises a protuberance provided to each of said side faces at a location adjacent said edge when each of said transverse elements is observed in a plan view.

6. The improvement according to claim 5, wherein each of said side faces has a stepped shape.

7. The improvement according to claim 4, wherein said means comprises a curved shape into which each of said side faces is formed, said curved shape being formed so as to protrude toward each of said contact surfaces when each of said transverse elements is observed in a plan view.

8. The improvement according to claim 7, wherein said curved shape comprises such a circular arc that is of a predetermined radius R has a center located on a straight line perpendicular to each of said contact surfaces and extending through a point at which said rocking edge and each of said contact surfaces meet.

9. The improvement according to claim 8, wherein said radius R is determined so as to satisfy the equation of:

$$R \leq (dr)^2 \times 9065 \div (q \times \cos \beta)$$

where dr is a distance between said edge and a contact surface of a shoulder of each of said transverse elements, for contact with said carrier, q is a maximum value of a thrust applied from each of said contact surfaces of said drive pulley and said driven pulley to each of said transverse element, and $\beta$ is an angle of a slope of each of said contact surfaces of said drive pulley and said driven pulley.

10. The improvement according to claim 4, wherein said means comprises a plurality of grooves formed in each of said side faces in a way to provide a larger contact surface area at a side face portion adjacent said edge than at a side face portion other than said side face portion adjacent said edge when each of said transverse element is observed in a plan view.

11. The improvement according to claim 10, wherein a distance between adjacent two of said grooves becomes larger at said side face portion adjacent said edge when observed in a plan view of each of said transverse elements.

12. A drive belt for a belt-drive continuously variable transmission having a pair of pulleys, comprising:

an endless carrier; and a plurality of transverse elements closely arranged on said carrier, each of the transverse elements having an edge in contact with an adjacent one of said transverse elements and pivotable about said edge relative to said adjacent one of said transverse elements in the longitudinal direction of said belt;

wherein each of said side faces comprises means for allowing the center of action of a force transmitted between each of said transverse elements and each of the pulleys, when each of said transverse elements is observed in a plan view, to coincide with a point at which said edge and each of contact surfaces of the pulleys meet.

13. The drive belt according to claim 12, wherein said means comprises a protuberance provided to each of said side faces at a location adjacent said edge when each of said transverse elements is observed in a plan view.

14. The drive belt according to claim 13, wherein each of said side faces has a stepped shape.

15. The drive belt according to claim 12, wherein said means comprises a curved shape into which each of said side faces is formed, said curved shape being formed so as to protrude toward each of the contact surfaces of the pulleys when each of said transverse elements is observed in a plan view.

16. The drive belt according to claim 15, wherein said curved shape comprises such a circular arc that is defined by a predetermined radius R whose center is located on a straight line perpendicular to each of the contact surfaces of the pulleys and extending through a point at which said edge and each of the contact surfaces of the pulleys meet.

17. The drive belt according to claim 16, wherein said radius R is determined so as to satisfy the equation of:

$$R \leq (dr)^2 \times 9065 \div (q \times \cos \beta)$$

where dr is a distance between said edge and a contact surface of a shoulder of each of said transverse elements, for contact with said carrier, q is a maximum value of a thrust applied from each of said contact surfaces of said drive pulley and said driven pulley to each of said transverse element, and $\beta$ is an angle of a slope of each of the contact surfaces of the pulleys.

18. The drive belt according to claim 12, wherein said means comprises a plurality of grooves formed in each of said side faces in a way as to provide a larger contact surface area at a side face portion adjacent said edge than at a side face portion other than said side face portion adjacent said edge when each of said transverse element is observed in a plan view.

19. The drive belt according to claim 18, wherein a distance between adjacent two of said grooves becomes larger at said side face portion adjacent said edge when observed in a plan view of each of said transverse elements.

20. The drive belt according to claim 19, wherein said grooves have variable widths which become smaller at said side face portion adjacent said edge when observed in a plan view of each of said transverse elements.

* * * * *